Jan. 8, 1946. A. B. SCHOLES ET AL 2,392,799
APPARATUS FOR FABRICATING LAMP STEMS
Filed Nov. 6, 1944 4 Sheets—Sheet 2
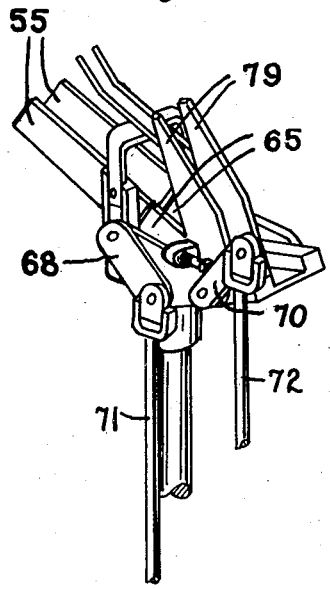
Fig. 3
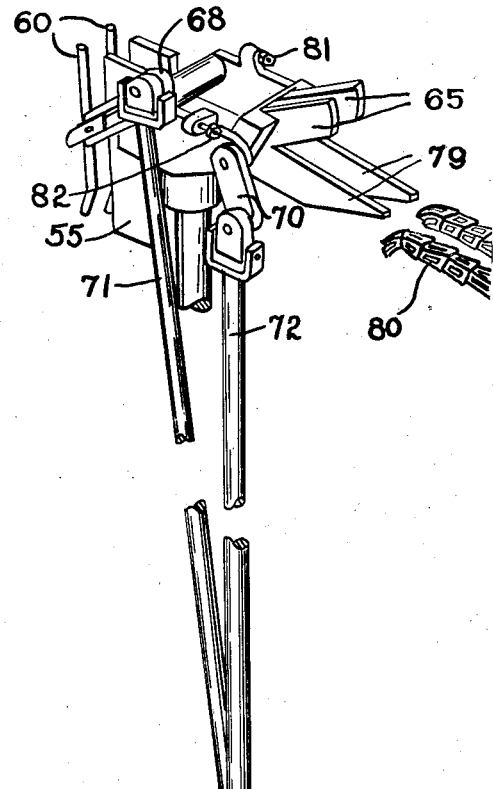
Fig. 2
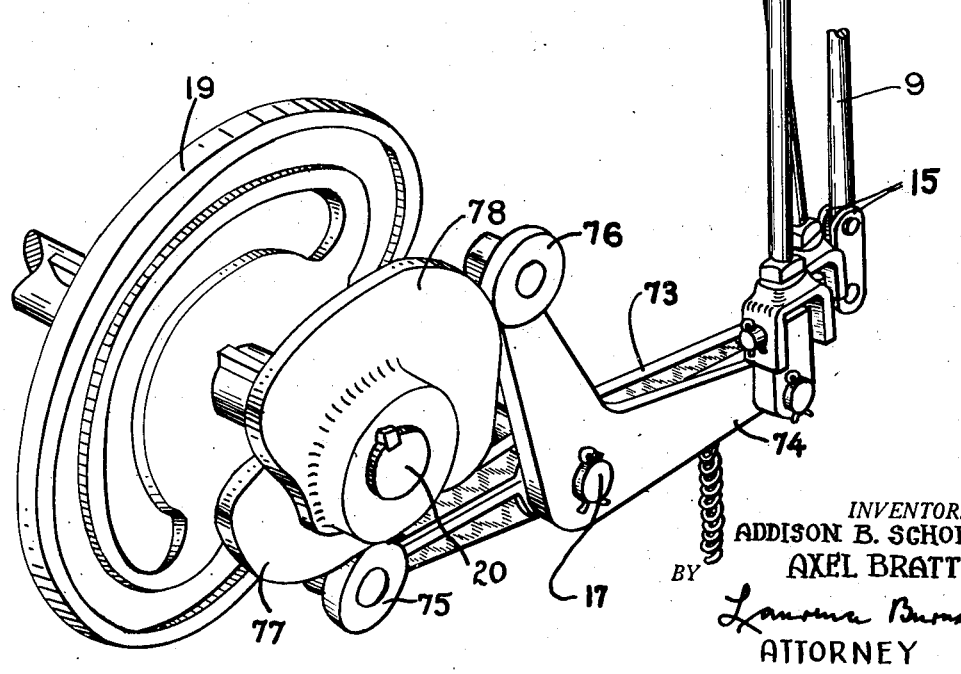
INVENTORS
ADDISON B. SCHOLES
AXEL BRATT
BY Lawrence Burns
ATTORNEY Jan. 8, 1946. A. B. SCHOLES ET AL 2,392,799
APPARATUS FOR FABRICATING LAMP STEMS
Filed Nov. 6, 1944 4 Sheets-Sheet 3
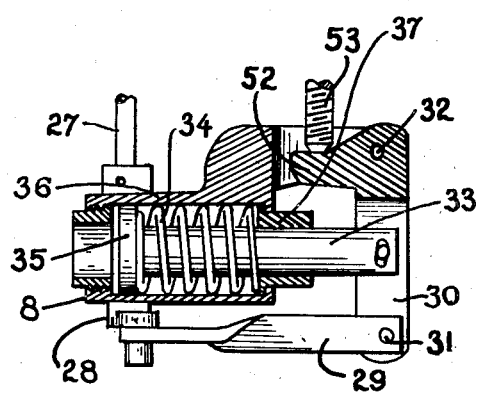
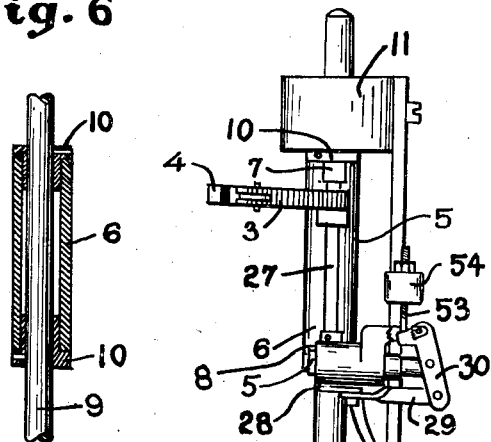
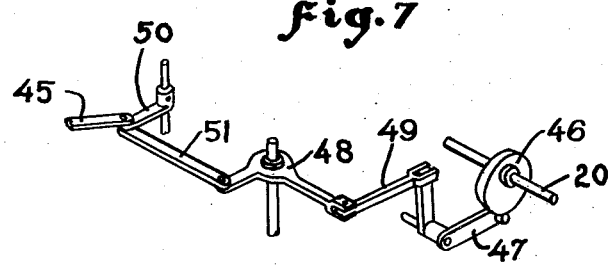
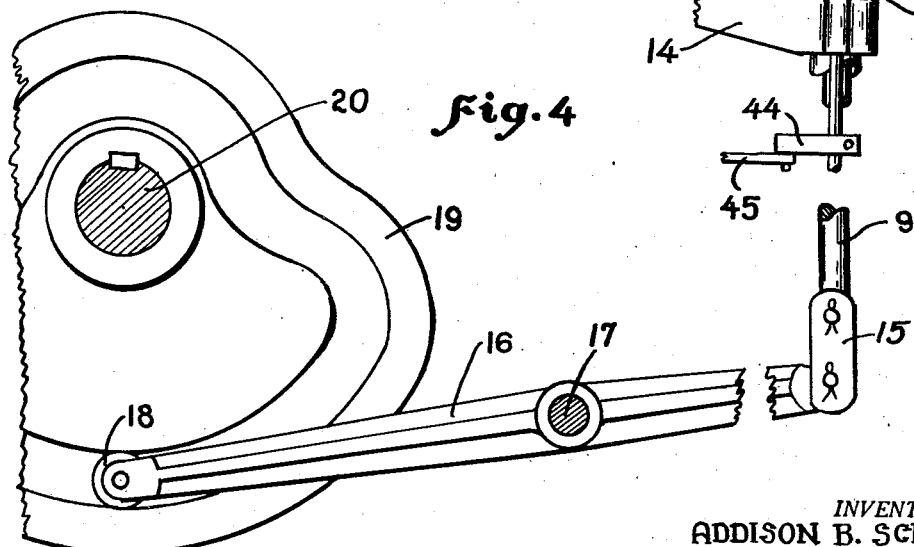
INVENTORS
ADDISON B. SCHOLES
AXEL BRATT
BY Lawrence Brown,
ATTORNEY

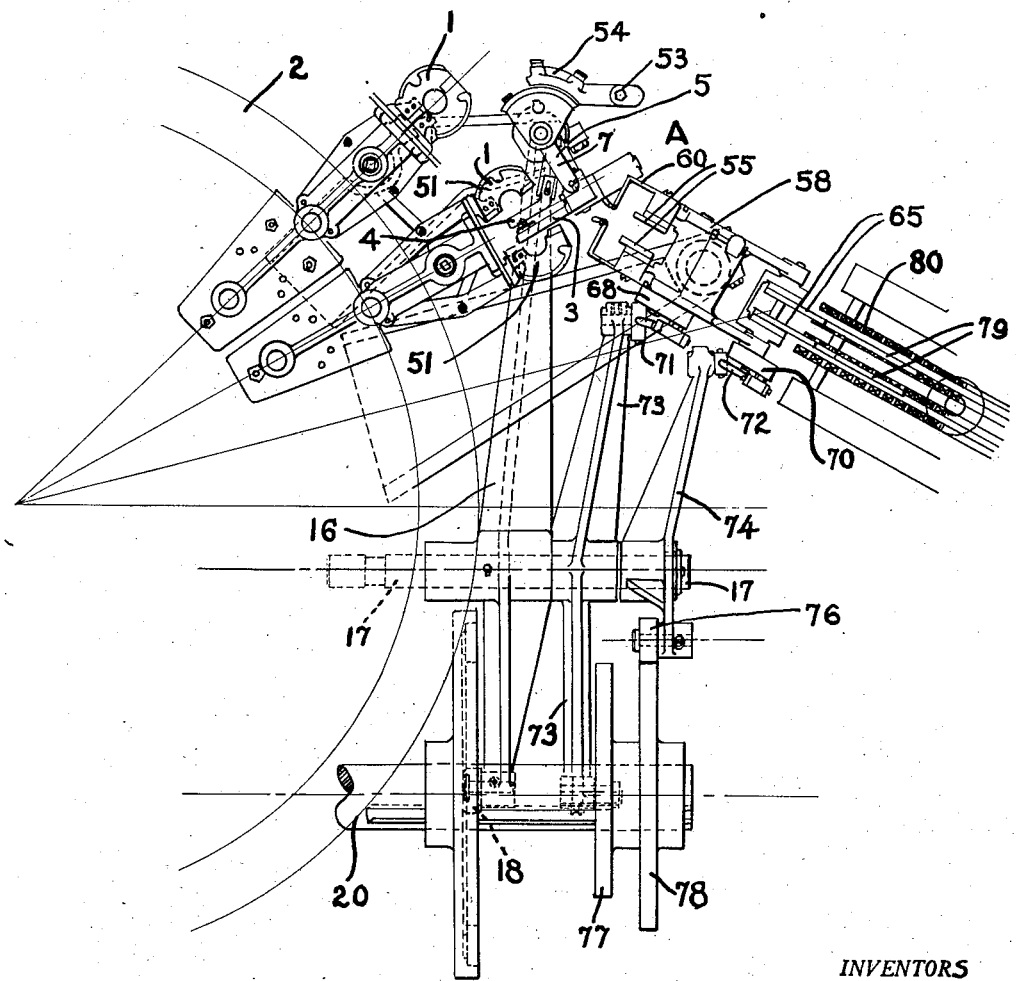

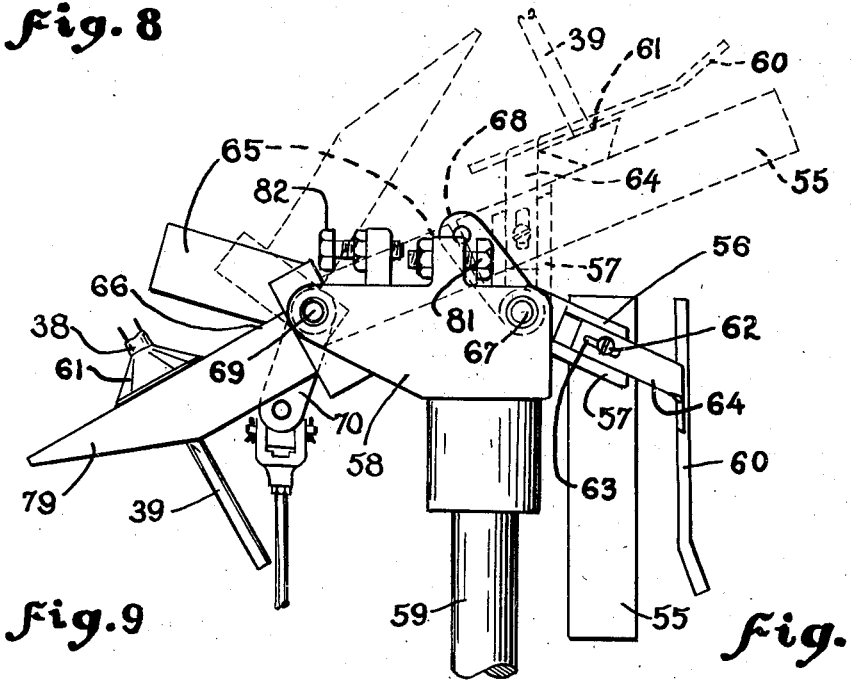
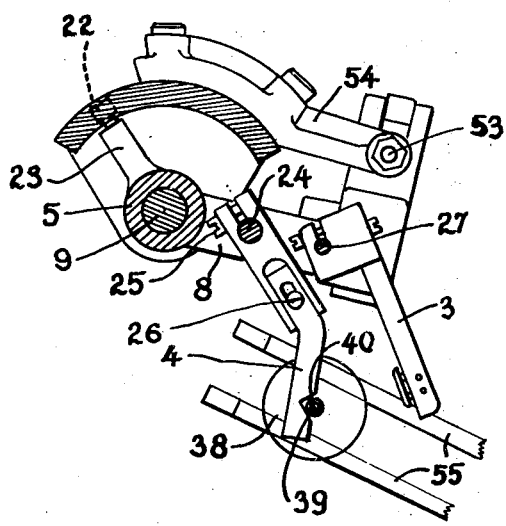
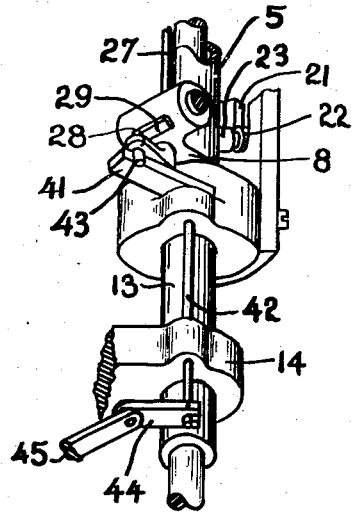

Patented Jan. 8, 1946

2,392,799

UNITED STATES PATENT OFFICE 2,392,799

APPARATUS FOR FABRICATING LAMP STEMS

Addison B. Scholes, Danvers, and Axel Bratt, Salem, Mass., assignors to Sylvania Electric Products Inc., Salem, Mass., a corporation of Massachusetts Application November 6, 1944, Serial No. 562,158

4 Claims. (Cl. 214—1)

This invention relates to improvements in automatic machines for fabricating stem assemblies for electronic devices and is particularly directed to means for removing completed units from the machine and arranging them in predetermined position and order for the execution of subsequent operations thereon.

The relatively delicate nature of the product requires that they be removed skillfully from the machine. A special operator has heretofore been required to perform this operation. To perform the operation by hand is unsatisfactory since, among other reasons, it subjects an operator to injury from contact with moving parts of the machine and to burns from the residual heat in the stems and machine parts.

A further object of the invention is to provide means for reversing the position of the stem after it is taken from the machine and depositing it in a proper position for the execution of a subsequent operation.

A further object of the invention is to provide means for rapidly and accurately handling the stems with a minimum of breakage.

Other objects and features will appear from the following description in connection with the accompanying drawings and will be particularly pointed out in the claims.

The invention may be briefly described as follows: In machines of the type to which this improvement is applied the completed stem arrives at a discharge station at which point the elements of the invention are situated. A pair of supporting standards are secured to fixed portions of the machine adjacent to the discharge station. A mechanism for removing a completed stem is mounted on one standard. Upon the other standard is pivotally mounted a pair of short aligned guideways. The first guideway, when in its inclined receiving position, has deposited thereon by the pick-off mechanism a completed stem which moves by gravity onto the second or reversing and delivery guideway. The second guideway is provided with an additional supporting means upon which the stem is received in inverted position when the second guideway is rotated into its delivery position. The inverted stem then moves by gravity from the second guideway to a receptacle or onto a conveyor.

While the carrier means is being indexed the first guideway is moved downward out of the path of the stem forming heads and returned to its stem receiving position for the next completed stem.

Cam means are provided properly timed to the operation of the machine to actuate the two stem manipulating guideways.

To provide a better understanding of the invention a preferred embodiment thereof will be described and illustrated in the accompanying drawings in which:

Figure 1 is a plan view of the apparatus;

Figure 2 is a perspective view illustrating the stem manipulating means and its operating elements;

Figure 3 is a detail perspective view illustrating the stem manipulating elements in their receiving positions;

Figure 4 is a side elevation of the pick-off mechanism and its actuating elements;

Figure 5 is a detail sectional view illustrating the construction of the stem gripping finger mechanism;

Figure 6 is a cross sectional view illustrating the manner in which the pick-off head is connected to its actuating rod;

Figure 7 is a perspective view of the cam and connecting elements for actuating the stem gripping fingers for the pick-off mechanism;

Figure 8 is a side elevation of the receiving, reversing and delivering mechanisms;

Figure 9 is an illustration of the position of the gripping fingers at the time of delivery of a completed stem; and Figure 10 is a perspective view of the mechanism for opening the stem gripping fingers to enable the pick-off mechanism to function.

The present invention relates to a mechanism for removing stem assemblies from the machine upon which they are fabricated, manipulating, and delivering them in position for a subsequent operation. The fabricating device may be of any suitable construction the complete details of which it will not be necessary to describe.

The invention is shown as applied to a circular type of machine in which a plurality of heads 1 are mounted on a circular carrier member indicated diagrammatically at 2. The heads 1 are provided with means for holding the various elements of the stem while they are being fabricated and act to present them to the various stations not shown located successively along the periphery of the machine where a series of operations are performed thereon the last of which completes the stem after which it is delivered to the ejecting station A shown in Figure 1.

The pick-off and transfer mechanism acts to remove the completed stem from the machine, reverse its position and deliver it to a conveyor or to a station preparatory to the execution of a subsequent operation. A pair of gripping fingers 3 and 4 act to grasp the stem and remove it from the machine. The fingers are mounted upon a carrier member 5 which is provided with a boss 6 and a pair of spaced horizontal arms 7 and 8. The carrier 5 is rotatably supported upon a vertically disposed rod 9 which passes through the boss 6. The carrier is prevented from relative axial movement upon the rod by means of a pair of bushings 10 securely pinned or otherwise fixed to the shaft 9. The bushings 10 serve as bearings for the carrier 5. The rod 9 is vertically movable within a pair of guides 11 which are connected by means of a cam plate 12. The lower guide 11 is secured to a supporting sleeve 13 which in turn is rigidly received in a supporting bracket 14 anchored to the main frame of the machine not shown or it may be fastened to the floor upon which the machine is mounted.

The rod 9 extends downward through the support 13 and has a pair of short links 15 pivotally secured at one of their ends thereto and pivoted at their other ends to the outer end of a lever 16 fulcrumed upon a rod 17 secured to the machine. The other end of the lever has a follower 18 thereon riding in a groove in a cam 19 mounted upon the main cam shaft 20 of the machine. Rotation of the cam 19 causes vertical movement of rod 9 by reason of the motion of the lever imparted thereto by the follower traversing the cam groove. The motion of the rod raises and lowers the carrier. In its down position it removes a stem from the machine while in its up position it deposits the stem upon the transfer mechanism. The carrier 5 is shown in its up position in Figure 4 and in its down position in Figures 1 and 9.

During its vertical travel the carriage is swung from a position where its fingers are in position to grasp a stem from the machine into a position up and away from the machine in position to deposit the stem upon the transfer mechanism. The rotation of the carrier is accomplished by a cam slot 21 in the cam plate 12 within which a follower 22 moves. The follower is secured to an arm 23 rigid with the carrier.

The stem holding finger 4 is fixed with respect to the carrier 5 while the finger 3 is movable into and out of clamping position. The finger 4 is supported upon a rod 24 rigidly fixed in the arms 7 and 8. The position of the arm 4 may be adjusted by loosening the screws 25 and 26. When the desired adjustment is secured the screws are tightened. The arm 3 is secured upon a vertical shaft 27 rotatable in the outer ends, of the arms 7 and 8. The lower end of the shaft 27 projects below the arm 8 and has secured thereon a short arm 28 to which is pivotally connected a link 29 the outer end of which is pivoted to a lever 30 at 31 which in turn is pivoted at 32 between the arms of a bifurcated extension of the arm 8.

The lever 30 itself is bifurcated and embraces the link 29 and also the outer end of a plunger 33 which is pivoted thereto between the pivots 31 and 32. The plunger extends into a cylinder 36 formed in the enlarged end of the arm 8. The inner end of the plunger is provided with a piston like enlargement 35 which travels in the cylinder. A compression spring 34 surrounds the plunger and seats at one end against the enlargement 35 and at its other end against the head 37 of the cylinder. The force of the spring therefore tends to draw the plunger inward which acts through its connection with the lever 30 and the link 29 to rotate the arm 28 which acts through the shaft 27 to yieldingly close the finger 3 against the finger 4 thereby to grip and hold a stem 38 therein. Although the fingers may be arranged to grip the stem at any suitable position, as herein shown they engage the exhaust tube 39. To insure a positive hold thereon a slot 40 is formed in the finger 4 within which the tube 39 is received.

The action of the main machine carrier head 2 is so timed with respect to the pick off mechanism that just prior to the time a completed stem arrives at station A the carrier 5 is in its down position shown in Figures 1 and 10 and the finger 4 is disposed in the path of the stem. When the stem finally comes to rest at station A its exhaust tube 39 is positioned in the slot 40 prior to which time the finger 3 has been retracted from the path of the moving parts.

To retract the finger the arm 28 is actuated by an arm 41 best shown in Figure 10, secured to the upper end of a vertical shaft 42 rotatably mounted in bearings in the guide 11 and the bracket 14. The arm 41 actuates the arm 28 by engagement with an elongated head 43 upon the pivoted screw connecting the arm with the link 29. The lower end of the shaft 42 has secured thereon an arm 44 to which is pivotally connected a link 45 which is actuated from the main cam shaft 20 in any suitable manner. As shown in Figure 7, the link 45 is actuated from a cam 46 mounted on the cam shaft 20. The cam actuates a 90 degree lever 47 which in turn actuates a second 90 degree lever 48 through a link 49. The lever 48 is connected to an arm 50 through a link 51 to which the link 45 is also connected. The fulcrum points of the levers 47, 48 and the arm 50 are fixed axes on the main machine frame. The cam 46 is so designed that it will hold the finger 3 in open position for the required period of time after which the spring 36 is permitted to act to cause the finger to grip the stem, after which the holding fingers 51 on the carrier head 1 release the stem. The carrier 5 then moves upward and swings out until it reaches its top position shown in Figures 4 and 9 at which time an arm 52 projecting from the lever 30 is engaged by a stop screw 53 rigidly fixed in a bracket 54 secured to the cam plate 12. Engagement of the arm 50 with the screw acts to swing the finger 3 into its releasing position as shown in Figure 9.

When the carrier 5 is in the position shown in Figure 9 the stem held in the fingers 3 and 4 is positioned directly above a pair of parallel guide bars 55 upon which the stem falls when the arm 3 releases it.

The bars 55 are mounted upon a movable receiving guideway indicated generally at 56 and shown best in Figure 8. The member 56 is provided with a base or frame member 57 to which the guide bars 55 are secured and which is pivotally mounted in a specially formed head member 58 rigidly fastened to a supporting post 59 connected to a fixed portion of the machine. To insure that the stems will not fall from the guides 55 it is desirable to provide additional guiding means which is shown as a pair of guide rods 60 which are located above the bars 55 and are spaced relatively close together and terminate short of the full length of the bars 55. The rods 60 are so positioned that when the stem engages the outer ends of the bars 55 which are inclined they will slide by gravity along the bars and the flare portion 61 of the stem will ride under the rods 60 and the exhaust tube will be embraced by them. The rods are adjustable toward and from the bars 55 by providing screws 62 extending through slots 63 formed in the rod supporting arms 64 and having threaded engagement with the head 58. Thus different sized stems can be accommodated.

The receiving position of the member 56 is shown in dotted lines in Figure 8, and in full lines in Figure 3. While the member 56 remains in this position the stem moves along the bars 55 and onto guide bars 65 upon a reversal and delivery member 66 which is in line with the member 56. The member 66 is pivotally mounted on the head 58. The member 56 is provided with a pivot shaft 67 which has an actuating arm 68 secured thereto while the member 66 has a pivot shaft 69 to which is secured an actuating arm 70.

The arms 68 and 70 have pivotally secured thereto respectively actuating links 71 and 72. The links 71 and 72 extend downward and are pivotally connected respectively to an end of the levers 73 and 74. The other end of the levers 73 and 74 are provided with cam followers 75 and 76 which ride upon the cams 77 and 78 respectively which are secured upon the main cam shaft 20. The levers 73 and 74 are fulcrumed upon the common fulcrum shaft 17.

At the instant the stem arrives upon the bars 65 the cams 77 and 78 act through the links and levers associated therewith to change the positions of the members 56 and 66 to that shown in full lines in Figure 8, and also in Figure 4. This change of position moves the member 56 downward out of the path of movement of machine elements functioning during the execution of other events in the machine cycle. The movement of the member 66 causes the stem to be picked up by the bars 65 and moved into inverted position. When thus inverted it is deposited upon a pair of reverse position delivery bars 79 which are downwardly inclined and disposed at an acute angle to the bars 65.

The stem slides down the bars 79 and thence onto a conveyor 80 or other means where further operations are performed thereon. The above cycle of operation is then repeated to deliver completed stems successively to the conveyor.

To accurately align the bars 55 and 65 it is desirable to provide adjustable stop means. To limit the upward travel of the member 56 a stop screw 81 is adjustably mounted in a boss formed on the head 58 and so positioned that the base on frame 57 will engage the screw and stop the member 56 in accurate predetermined position. Another stop screw 82 is so situated upon the head 58 that its head will be engaged by the actuating lever 70 for the member 66, when the bars 55 and 65 are in alignment.

What we claim is:

1. In a stem machine having a plurality of stem forming and manipulating heads, an ejecting station to which completed stems are delivered, a pick off member having fingers for gripping the stem when it arrives at the ejecting station, a movable inclined receiving guideway adjacent to said station, means for moving said pick off member to a position with the stem over said guideway, means for releasing the stem onto the guideway, a reversing and delivering member onto which the stem moves by gravity from said receiving member, means acting in timed relation to the delivery of a stem thereto to reverse said delivering member thereby to reverse the stem and deliver it to a conveyor means, and means to move said receiving guideway from the path of moving parts on said stem machine during its delivery of another stem.

2. In a machine for automatically manufacturing stem assemblies for electronic devices; pick off means for removing completed stems therefrom, a movable inclined receiving guideway upon which said stems are deposited, a reversing and delivering member situated in line with said receiving member and onto which said stems move by gravity, said reversing and delivering member having parallel spaced supports upon which the stem is received in its initial position and reversed position supports disposed above and at an acute angle to said initial position supports, means for tipping said reversing and delivering member to transfer the stem from initial position to reversed position with said reversed position supports disposed in an inclined position thereby to cause the stem to move by gravity therefrom to a conveyor or rack in reversed position and means to move said first named receiving guideway away from contact with the machine when no stem is being picked from the machine.

3. In a machine for automatically fabricating a stem assembly for electronic devices having a carrier member upon which are mounted a plurality of heads for holding the stem elements during the fabricating period, indexing means for successively moving a completed stem from station to station and finally into a discharging station; automatic pick off means for removing the completed stems from the carrier at that discharge station, a movable inclined receiving guideway upon which said pick off means deposits the completed stems, a pivoted reversing and delivering member positioned in line with said receiving guideway and having parallel spaced supports upon which the stems are received in their initial position and reversed position supports disposed above and at an acute angle to said other supports, a driven cam on said machine, a lever and arm connection from said cam to said reversing and delivery member acting to swing it into reverse position with said reverse supports in an inclined position thereby causing the stems to move by gravity therefrom to a rack or conveyor in reversed position and a second driven cam having a lever and arm connection to said receiving guideway acting to move it out of the path of said fabricating heads during the indexing motion thereof.

4. In a stem machine having a plurality of stem forming and manipulating heads, an ejecting station to which completed stems are delivered, a pick off member having fingers for gripping the stem when it arrives at the ejecting station, a movable inclined receiving guideway adjacent to said station, means for moving said pick off member to a position with the stem over said guideway, means for releasing the stem onto the guideway, a reversing and delivering member onto which the stem moves by gravity from said receiving member and means acting in timed relation to the delivery of a stem thereto to reverse said delivering member thereby to reverse the stem and deliver it to a conveyor means.

ADDISON B. SCHOLES.
AXEL BRATT.